(12) United States Patent
Yoshikawa et al.

(10) Patent No.: US 10,035,099 B2
(45) Date of Patent: Jul. 31, 2018

(54) CO2 REMOVAL DEVICE

(71) Applicant: HITACHI CHEMICAL COMPANY, LTD., Tokyo (JP)

(72) Inventors: Kouhei Yoshikawa, Tokyo (JP); Masato Kaneeda, Tokyo (JP); Hidehiro Nakamura, Tokyo (JP); Toshiaki Shirasaka, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 98 days.

(21) Appl. No.: 15/301,099

(22) PCT Filed: Jul. 8, 2015

(86) PCT No.: PCT/JP2015/069584
§ 371 (c)(1),
(2) Date: Sep. 30, 2016

(87) PCT Pub. No.: WO2016/006620
PCT Pub. Date: Jan. 14, 2016

(65) Prior Publication Data
US 2017/0014750 A1     Jan. 19, 2017

(30) Foreign Application Priority Data
Jul. 9, 2014   (JP) ................................ 2014-141002

(51) Int. Cl.
*B01D 53/04* (2006.01)
*B01J 20/04* (2006.01)
(Continued)

(52) U.S. Cl.
CPC ......... *B01D 53/0438* (2013.01); *B01D 53/04* (2013.01); *B01D 53/0462* (2013.01);
(Continued)

(58) Field of Classification Search
CPC .. B01D 53/04; B01D 53/047; B01D 53/0438; B01D 53/0454; B01D 53/0462;
(Continued)

(56) References Cited

U.S. PATENT DOCUMENTS 3,619,130 A * 11/1971 Ventriglio .............. B01D 53/04
                                                        95/115
3,808,773 A     5/1974 Reyhing et al.
(Continued)

FOREIGN PATENT DOCUMENTS

| JP | 55-127122 A | 10/1980 |
| JP | 63-252528 A | 10/1988 |

(Continued)

*Primary Examiner* — Frank Lawrence
(74) *Attorney, Agent, or Firm* — Volpe and Koenig, P.C.

(57) ABSTRACT

A $CO_2$ removal device includes: a $CO_2$ capturing material which captures $H_2O$ and $CO_2$ in a gas; a reaction container which contains the $CO_2$ capturing material; an $H_2O$ measuring unit for measuring the concentration of $H_2O$ in the gas; an $H_2O$ concentration adjustment device which adjusts the concentration of $H_2O$ on the basis of information obtained by the $H_2O$ measuring unit; a gas introduction path introducing the gas into the reaction container from the $H_2O$ concentration adjustment device and bringing the gas into contact with the $CO_2$ capturing material; a first gas discharge path discharging the gas from the reaction container after the gas has been brought into contact with the $CO_2$ capturing material; and a second gas discharge path discharging the gas that has been desorbed from the $CO_2$ capturing material from the reaction container.

16 Claims, 6 Drawing Sheets

(51) Int. Cl.

| | | |
|---|---|---|
| *B01J 20/06* | (2006.01) | |
| *B01J 20/08* | (2006.01) | |
| *B01J 20/10* | (2006.01) | |
| *B01J 20/18* | (2006.01) | |
| *B01J 20/20* | (2006.01) | |
| *B01D 53/62* | (2006.01) | |
| *B01D 53/82* | (2006.01) | |
| *B01D 53/96* | (2006.01) | |
| *B01D 53/34* | (2006.01) | |
| *B01J 38/02* | (2006.01) | |
| *B01J 37/03* | (2006.01) | |
| *B01J 37/08* | (2006.01) | |
| *B01J 23/10* | (2006.01) | |
| *B01J 35/10* | (2006.01) | |
| *B01D 53/30* | (2006.01) | |
| B01D 53/047 | (2006.01) | |
| B01D 53/06 | (2006.01) | |
| B01D 53/81 | (2006.01) | |
| B01D 53/26 | (2006.01) | |

(52) U.S. Cl.
CPC .......... *B01D 53/30* (2013.01); *B01D 53/346* (2013.01); *B01D 53/62* (2013.01); *B01D 53/82* (2013.01); *B01D 53/96* (2013.01); *B01J 20/04* (2013.01); *B01J 20/06* (2013.01); *B01J 20/08* (2013.01); *B01J 20/10* (2013.01); *B01J 20/18* (2013.01); *B01J 20/20* (2013.01); *B01J 23/10* (2013.01); *B01J 35/1019* (2013.01); *B01J 37/031* (2013.01); *B01J 37/08* (2013.01); *B01J 38/02* (2013.01); *B01D 53/047* (2013.01); *B01D 53/0454* (2013.01); *B01D 53/06* (2013.01); *B01D 53/261* (2013.01); *B01D 53/81* (2013.01); *B01D 2251/602* (2013.01); *B01D 2253/108* (2013.01); *B01D 2253/1124* (2013.01); *B01D 2257/504* (2013.01); *B01D 2257/80* (2013.01); *B01D 2258/0283* (2013.01); *B01D 2259/402* (2013.01); *B01D 2259/4009* (2013.01); *B01D 2259/40096* (2013.01); *Y02C 10/04* (2013.01); *Y02C 10/08* (2013.01)

(58) Field of Classification Search
CPC ...... B01D 53/06; B01D 53/261; B01D 53/30; B01D 53/346; B01D 53/62; B01D 53/81; B01D 53/82; B01D 53/96; B01D 2251/602; B01D 2253/108; B01D 2253/1124; B01D 2257/504; B01D 2257/80; B01D 2258/0283; B01D 2259/4009; B01D 2259/40096; B01D 2259/402; B01J 20/04; B01J 20/06; B01J 20/08; B01J 20/10; B01J 20/18; B01J 20/20; B01J 35/1019; B01J 37/031; B01J 37/08; B01J 38/02; Y02C 10/04; Y02C 10/08
USPC ...... 96/109, 111, 121, 126–128, 132; 95/10, 95/139; 423/230
See application file for complete search history.

(56) References Cited

U.S. PATENT DOCUMENTS

| | | | | |
|---|---|---|---|---|
| 5,989,313 | A * | 11/1999 | Mize | ................ B01D 53/0454 95/10 |
| 7,846,237 | B2 * | 12/2010 | Wright | ............... B01D 53/0462 95/11 |
| 2008/0282892 | A1 | 11/2008 | Deckman et al. | |

FOREIGN PATENT DOCUMENTS

| | | |
|---|---|---|
| JP | 01-236915 A | 9/1989 |
| JP | 06-091127 A | 4/1994 |
| JP | 07-124434 A | 5/1995 |
| JP | 10-137533 A | 5/1998 |
| JP | 11-244652 A | 9/1999 |
| JP | 2003-225561 A | 8/2003 |
| JP | 2010-184229 A | 8/2010 |
| JP | 2010-527757 A | 8/2010 |
| JP | 2014-149393 A | 8/2014 |
| WO | 2014012963 A1 | 1/2014 |
| WO | 2015082567 A1 | 6/2015 |

\* cited by examiner

US 10,035,099 B2

CO2 REMOVAL DEVICE

TECHNICAL FIELD

The present invention relates to: a device for removing $CO_2$ from a gas containing $CO_2$, such as a combustion exhaust gas or the atmosphere; in particular a technology for reducing energy necessary for removing $CO_2$.

BACKGROUND ART

Global warming caused by the emission of a greenhouse effect gas is a global problem. As examples of the greenhouse effect gases, carbon dioxide ($CO_2$), methane ($CH_4$), and fluorocarbons (CFCs) are known. Among those gases, $CO_2$ has the greatest impact and the establishment of a system for separating and removing $CO_2$ from a thermal electric power plant, a steel plant, and the like has been an urgent issue.

Further, $CO_2$ also has an affect on the human body. For example, when a gas containing $CO_2$ of a high concentration is inhaled, a health hazard is caused and hence the control of a $CO_2$ concentration is required in an enclosed space such as a room interior. In particular, a device for removing $CO_2$ is required in an environment where outdoor air and indoor air are hardly interchangeable such as a space station. In other fields too, a system for removing $CO_2$ is required because $CO_2$ possibly has a negative effect during the manufacture of foods and chemical products.

Known examples of methods for solving the problem are a chemical absorption method, a physical absorption method, a membrane separation method, an adsorptive separation method, and a cryogenic distillation method. Among those methods, there is a $CO_2$ separation and recovery method using a solid $CO_2$ capturing material. In a $CO_2$ removal system using a $CO_2$ capturing material, $CO_2$ is captured by introducing a $CO_2$ containing gas into a capturing material container filled with the $CO_2$ capturing material and bringing the $CO_2$ containing gas into contact with the $CO_2$ capturing material at the atmospheric pressure or an added pressure under a prescribed temperature condition. Successively, the captured $CO_2$ is desorbed by heating the capturing material or depressurizing the interior of the capturing material container. The $CO_2$ capturing material from which $CO_2$ is desorbed is cooled or depressurized and the solid $CO_2$ capturing material is initialized. The $CO_2$ capturing material is used for removing $CO_2$ from a $CO_2$ containing gas by repeating capture and desorption as stated above. Further, it can be used also for separating and recovering $CO_2$ at a high concentration from a $CO_2$ containing gas by the above mechanism.

In such a device for capturing and removing $CO_2$, zeolite is mainly used as a $CO_2$ capturing material. For example, Patent Literature 1 describes a $CO_2$ removal method of adsorbing $CO_2$ by bringing a gas containing $CO_2$ into contact with a $CO_2$ adsorptive agent of a zeolite type and successively desorbing $CO_2$ by heating it.

CITATION LIST

Patent Literature

Patent Literature 1: Japanese Translation of PCT international Application Publication No. JP-T-2010-527757

SUMMARY OF INVENTION

Technical Problem

In the case of zeolite, the quantity of a captured $CO_2$ reduces when it is brought into contact with a gas containing water vapor ($H_2O$) and hence $H_2O$ is generally removed at a stage prior to $CO_2$ capture. It is said for example that, in the method of capturing and removing $CO_2$ described in Patent Literature 1, when a $CO_2$ containing gas contains water vapor ($H_2O$), an $H_2O$ concentration is reduced to preferably 400 Ppm or less and yet preferably to 20 ppm or less.

Some kinds of solid $CO_2$ capturing materials are considered to have a favorable influence caused by bringing a gas containing $H_2O$ into contact, for example the increase of the quantity of a captured $CO_2$, the reduction of temperature for desorbing $CO_2$, or both of them. In Patent Literature 1, however, those are not discussed and a device configuration using those is not described.

An object of the present invention is to provide a $CO_2$ removal device allowing energy consumption to reduce.

Solution to Problem

A $CO_2$ removal device according to the present invention includes: a $CO_2$ capturing material to capture $H_2O$ and $CO_2$ in a gas; a reaction container which contains the $CO_2$ capturing material; an $H_2O$ measuring unit for measuring the concentration of $H_2O$ in the gas; an $H_2O$ concentration adjustment device which adjusts the concentration of $H_2O$ on the basis of information obtained by the $H_2O$ measuring unit; a gas introduction path for introducing the gas into the reaction container from the $H_2O$ concentration adjustment device and bringing the gas into contact with the $CO_2$ capturing material; a first gas discharge path for discharging the gas from the reaction container after the gas has been brought into contact with the $CO_2$ capturing material; and a second gas discharge path for discharging the gas that has been desorbed from the $CO_2$ capturing material from the reaction container.

Advantageous Effects of Invention

The present invention makes it possible to reduce an energy consumption in removing $CO_2$ more than ever before.

DESCRIPTION OF EMBODIMENTS

Figure 1:
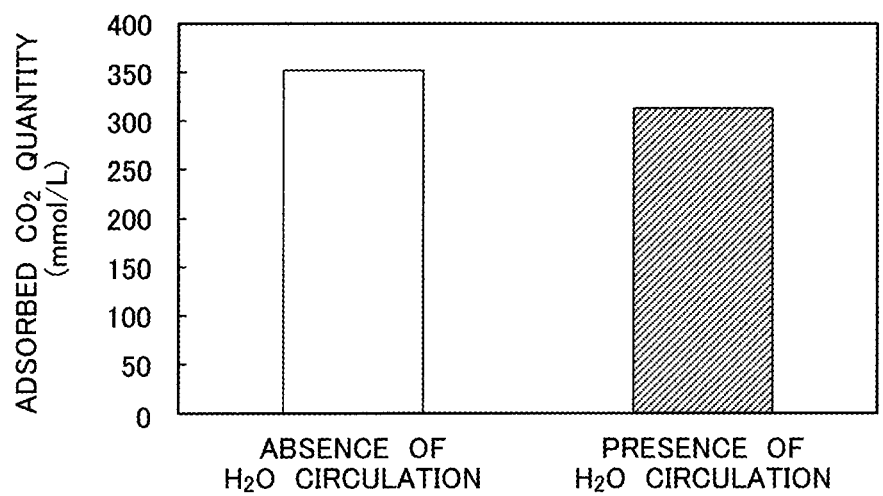
FIG. 1 is a graph comparing the quantity of captured $CO_2$ between the presence and absence of $H_2O$ circulation in a cerium oxide according to Example 1.

Best modes for carrying out the present invention are shown hereunder. The scope of the present invention however is not limited to the examples shown below.

The present inventors, as a result of earnestly studying the above problem, have found that, in a device for separating and removing $CO_2$, $H_2O$, or both of them from a gas containing $CO_2$ and $H_2O$ with a solid $CO_2$ capturing material, the energy required for separating and removing $CO_2$ can be reduced by: having the device comprise a capturing material capable of capturing $H_2O$ and $CO_2$, a reaction container which contains the capturing material, an $H_2O$ measuring unit for measuring the concentration of $H_2O$ in a gas, an $H_2O$ concentration adjustment device for adjusting the concentration of $H_2O$ in the gas, a means for controlling the $H_2O$ concentration adjustment device on the basis of information obtained by the $H_2O$ measuring unit, a pipe for introducing a mixed gas containing $CO_2$ and $H_2O$ into the reaction container and bringing the mixed gas into contact with the capturing material, and a pipe for discharging the mixed gas from the reaction container after the mixed gas has been brought into contact with the capturing material; and leaving $H_2O$ in the $H_2O$ concentration adjustment device. This is presumably because the surface state of a solid changes by the circulation of $H_2O$, the state of capturing $CO_2$ of a low desorption temperature can be formed, and an energy for heat required for desorbing $CO_2$ can be reduced. Moreover, this is presumably because an energy required for removing $H_2O$ can be reduced in comparison with the case of removing the whole quantity of $H_2O$.

Here, in this description, "removal" also intends that $CO_2$ is recovered from a $CO_2$ capturing material. Further, it also intends that purity is increased by recharging a recovered gas as an inlet gas.

A capturing material used for capturing $CO_2$ and $H_2O$ may be any material. The examples are a metal oxide, an activated carbon, a carbonate of alkali metal, a hydroxide of alkali metal, a layered double hydroxide, and a solid organic compound. The $CO_2$ capturing material may be a single type or a combination of two or more types. Otherwise one may be used as a carrier and the other may be supported by using a method of impregnation or the like.

As a metal oxide, preferably a porous metal oxide or yet preferably an oxide or a complex oxide containing at least one metal selected from the group of Ce, a rare-earth metal other than Ce, and zirconium is used. When the combination of oxides is used as stated above, $CO_2$ can be adsorbed even after $H_2O$ is brought into contact and the $CO_2$ desorption temperature can be lowered. This is presumably because, in such oxides, a hydroxyl group (—OH) is formed by the oxide surfaces reacting with $H_2O$ and $CO_2$ can be adsorbed on the surfaces in the shape of a hydrogen carbonate (—$CO_3H$) by the reaction between the functional group and $CO_2$. Known examples of methods of synthesizing the capturing material are the processing methods such as an impregnation method, a kneading method, a coprecipitation method, and a sol-gel method. For example, the capturing material may be precipitated by adjusting pH to 7 to 10 by adding a basic compound such as ammonia water, sodium hydroxide, or calcium hydroxide to a solution containing a nitrate of Ce. When an oxide is formed by precipitation, the oxide may be used directly or may be oxidized further by calcination.

As a metal oxide, an oxide obtained by calcining a layered double hydroxide may be used. The layered double hydroxide is a substance also called a hydrotalcite compound and is a material containing two or more metal elements and having a composition that can be represented by the following chemical formula (1). Here, in the chemical formula (1), $M^2$ represents a divalent metal ion such as Mg, Mn, Fe, Co, Ni, Cu, or Zn, $M^3$ represents a trivalent metal ion such as Al, Cr, Fe, Co, or In, and $A^n$ represents an n-valent anion such as a carbonate ion, a nitrate ion, or a sulfate ion, respectively. As each of $M^2$, $M^3$, and $A^n$, a single ion may be used or two or more ions may be used.

$$M^2_{1-x}M^3_x(OH)_2A^n_{x/n} \cdot yH_2O \qquad \text{Chemical formula (1)}$$

Known examples of methods for synthesizing a layered double hydroxide are the processing methods such as an impregnation method, a kneading method, a coprecipitation method, and a sol-gel method. For example, the layered double hydroxide may be precipitated by adjusting pH to 8 to 11 by adding a basic compound such as ammonia water, sodium hydroxide, or calcium hydroxide after sodium carbonate is added to a solution containing a nitrate of Mg and Al. The material obtained by the precipitation is a layered double hydroxide and hence it may be calcined in order to obtain a metal oxide or a complex oxide of metals. Any temperature may be adopted as the calcination temperature but a metal oxide can be obtained when it is calcined at 400° C. or higher, for example.

As other metal oxides and complex oxides of metals, silica ($SiO_2$) alumina ($Al_2O_3$), and zeolite may be used. Further, in order to increase a specific surface area, improve thermal resistance, and reduce the quantity of a used metal, it is also possible to support an oxide or a complex oxide containing at least one metal selected from the group of Ce, a rare-earth metal, and zirconium by silica, alumina, or zeolite.

An activated carbon used as a capturing material may be any material. In an activated carbon, when a nitrogen element (N) is contained in the interior, the basicity may increase and $CO_2$ adsorption performance may improve in some cases and hence an activated carbon having a large N content may preferably be used sometimes. When such an activated carbon is synthesized, a method of bringing a gas containing ammonia ($NH_3$) into contact with an activated carbon or a method of synthesizing an activated carbon from an organic molecule containing N abundantly is conceivable.

As a solid organic compound, an organic compound having a basicity is preferably used and an example thereof is an organic compound having an amino group.

A reaction container filled with a $CO_2$ capturing material, an $H_2O$ capturing material, or both of them may be installed at the latter stage of another reaction container filled with another $CO_2$ capturing material. Further, a method of installing a valve for switching a circulation route in a pipe part connecting reaction containers and using the reaction container of the latter stage when needed may be used. For example, when a capturing material capable of capturing both $CO_2$ and $H_2O$ is packed in the reaction container of the former stage, it is estimated that the capture of a gas of either $CO_2$ or $H_2O$ is saturated firstly and the gas is discharged from the exit of the reaction container. When the capture of $CO_2$ is saturated firstly, a capturing material deteriorating $CO_2$ capture performance when $H_2O$ circulates may be used in the reaction container installed at the latter stage. Known examples of such a capturing material are zeolite and activated carbon. Meanwhile, when the capture of $H_2O$ is saturated firstly, a capturing material of low $CO_2$ capture performance may be used in the reaction container installed at the latter stage. Known examples of such a capturing material are silica and alumina. When the ratio of the concentrations of $H_2O$ and $CO_2$ in a gas is likely to vary and the capture of which gas is more likely to be saturated is unknown, a method of installing two reaction containers at the latter stage and selecting a used reaction container in accordance with the gas the capture of which is saturated may be adopted. When $H_2O$ and $CO_2$ can be removed only by the capturing container of the former stage, the treatment for desorbing $H_2O$ and $CO_2$ in the reaction container of the latter stage is not required and energy consumption can be reduced.

A known example of the combination of such reaction containers and such $CO_2$ capturing materials is a configuration of installing a reaction container filled with a $CO_2$ capturing material using an oxide or a complex oxide containing at least one metal selected from the group of Ce, a rare-earth metal other than Ce, and zirconium at the former stage and installing a reaction container filled with a $CO_2$ capturing material using zeolite at the latter stage. When such a configuration is used, only the capture of $CO_2$ is saturated in the reaction container of the former stage and, even when the gas is discharged from an exit, $CO_2$ can be captured in the reaction container of the latter stage. Even when the capture of $H_2O$ is saturated in the reaction container of the former stage and the gas is discharged from the exit, $H_2O$ can be captured by zeolite at the latter stage, but generally zeolite adsorbs $H_2O$ stronger than $CO_2$, and hence, in order to desorb $H_2O$ from zeolite, the load required of heat and depressurization is higher than the case of desorbing $CO_2$. In such a configuration therefore, energy consumption is thou ht to be reduced rather by adjusting an $H_2O$ concentration so that the capture of $H_2O$ may not be saturated in the reaction container of the former stage.

A known example of the combination of such reaction containers and such $CO_2$ capturing materials is a configuration of installing a reaction container filled with a $CO_2$ capturing material using an oxide or a complex oxide containing at least one metal selected from the group of Ce, a rare-earth metal other than Ce, and zirconium at the former stage and installing a reaction container filled with an $H_2O$ capturing material using silica or alumina at the latter stage. When such a configuration is used, only the capture of $H_2O$ is saturated in the reaction container of the former stage and, even when the gas is discharged from an exit, $H_2O$ can be captured in the reaction container of the latter stage. When the capture of $CO_2$ is saturated in the reaction container of the former stage and the gas flows into the latter stage, since the $CO_2$ capture performance of silica or alumina is low, $CO_2$ may possibly be removed insufficiently. In such a configuration therefore, it is necessary to prevent the capture of $CO_2$ from being saturated at the former stage by measuring a $CO_2$ concentration distribution in the reaction container of the former stage or the like.

As such a mixed gas containing $CO_2$ and $H_2O$, any gas may be used. Examples thereof are a boiler exhaust gas at a coal-fired power plant, a combustion exhaust gas of an automobile or the like, a gas generated by fermentation derived from a microorganism, the atmosphere, and the exhaled breath of a living thing. The composition is not limited but, in the case of a boiler exhaust gas or a combustion exhaust gas for example, in addition to $CO_2$ and $H_2O$, nitrogen ($N_2$), oxygen ($O_2$) nitrogen oxide ($NO_x$), sulfur oxide ($SO_x$), carbon monoxide (CO), hydrocarbons such as methane ($CH_4$), and ashes are contained. In such gases, particularly $NO_x$, $SO_x$, and ashes are considered to deteriorate the $CO_2$ capture performance of a capturing material and hence it is desirable to remove them beforehand when they are contained much.

As an $H_2O$ concentration adjustment device in the $CO_2$ removal device, any device may be used. For example, an $H_2O$ concentration adjustment device using the temperature dependency of the saturated vapor pressure of $H_2O$ includes a cooled condenser. The device is generally used for the purpose of reducing an $H_2O$ concentration but may also be used for example for increasing the saturated vapor pressure of $H_2O$ by adjusting temperature and increasing an $H_2O$ concentration in a $CO_2$ containing gas. Another example of the $H_2O$ concentration adjustment device using the temperature dependency of the saturated vapor pressure of $H_2O$ is a device of adjusting an $H_2O$ concentration in a gas by feeding a gas in water ($H_2O$) in a liquid the temperature of which is adjusted. When such a device is used, a foaming machine such as a bubbler may be disposed in order to increase the contact area between water and a gas and improve efficiency. By using such a configuration, it is possible to control an $H_2O$ concentration appropriately.

Another example of the $H_2O$ concentration adjustment device is an $H_2O$ concentration adjustment device which contains a material to capture $H_2O$. The material adsorbing $H_2O$ may be any material. An example thereof is a porous material or a resin having the function of absorbing water. The components of the porous material are not limited but examples thereof are silica ($SiO_2$), alumina ($Al_2O_3$), zirconium oxide ($ZrO_2$), cerium oxide ($CeO_2$), a layered double hydroxide such as hydrotalcite, zeolite, an activated carbon, and an organic compound such as a resin material.

When such an adsorptive agent is used, it is estimated that $H_2O$ is adsorbed when an $H_2O$ concentration in a gas is high and inversely $H_2O$ in a capturing material is desorbed when an $H_2O$ concentration is low. Even when an $H_2O$ concentration in a $CO_2$ containing gas varies rapidly therefore, it is possible to inhibit the $H_2O$ concentration in a gas touching a $CO_2$ capturing material from varying.

A device to adjust an $H_2O$ concentration may be a single device or may be used by combining two or more devices.

For example, when an $H_2O$ concentration is adjusted by using the temperature dependency of the saturated vapor pressure of $H_2O$, heat absorption or heat generation is caused by the vaporization of water ($H_2O$) or the condensation of water vapor and it is estimated that, when the quantity is large, the temperature difference from a heat transfer part increases and the temperature cannot be controlled appropriately. In such a case, it is desirable to control an $H_2O$ concentration with a high degree of accuracy with two or more $H_2O$ concentration adjustment devices.

As a device for measuring an $H_2O$ concentration, any device may be used. Examples thereof are a dew-point hygrometer, an electric resistance hygrometer, a thermal conductivity hygrometer, and a wet-and-dry-bulb hygrometer. In order to adjust an $H_2O$ concentration with an $H_2O$ concentration adjustment device on the basis of a measured $H_2O$ concentration, it is desirable to output an $H_2O$ concentration as an electric signal and control the $H_2O$ concentration adjustment device on the basis of the signal.

The site where a device for measuring an $H_2O$ concentration is disposed is not limited and examples thereof are a method of measuring it on the upstream side of an reaction container filled with a $CO_2$ capturing material, a method of measuring the quantity distribution of captured $H_2O$ and measuring it in the interior of the packed bed of a $CO_2$ capturing material in a reaction pipe in order to estimate capture saturation, and a method of measuring it on the downstream side of a reaction pipe in order to observe capture saturation.

An $H_2O$ concentration in a mixed gas after it has been adjusted with the $H_2O$ concentration adjustment device is not particularly limited but for example is preferably 20 ppm or more and may be 2,000 ppm or more.

An $H_2O$ concentration may also be decided from a $CO_2$ concentration. On this occasion, the mole ratio to $CO_2$ is preferably not less than 0.5 to not more than 40. By controlling a mole ratio to $CO_2$ to not less than 0.5, the surface state of a solid changes, a $CO_2$ capture state of a low desorption temperature can be formed, and the energy required for heat necessary for desorbing $CO_2$ can be reduced. By controlling a mole ratio to $CO_2$ to not more than 40, it is possible to prevent the saturation of $H_2O$ capture from occurring before the saturation of $CO_2$ capture in a $CO_2$ and $H_2O$ capturing material.

A method of desorbing $CO_2$ after $CO_2$ is captured in a capturing material may be any method. Examples thereof are a temperature swinging method of raising the temperature of a capturing material and desorbing $CO_2$, a pressure swinging method of depressurizing the atmosphere of a capturing material and desorbing $CO_2$, and a temperature/pressure swinging method of using both the methods. Those desorption methods may be decided in consideration of the pressure, the $CO_2$ partial pressure, and the temperature of a $CO_2$ containing gas.

Examples of methods of heating a $CO_2$ capturing material when a temperature swinging method is used are a method of bringing a heating medium such as a heated gas or liquid directly into contact with a $CO_2$ capturing material, a method of circulating a heating medium such as a heated gas or liquid in a heat-transfer tube or the like and heating a $CO_2$ capturing material by heat conduction from a heat-transfer surface, and a method of electrically generating heat by an electric furnace or the like and heating a $CO_2$ capturing material.

When a heating gas of a high temperature is brought into contact with a capturing material, the heating gas may be decided in consideration of the application of the separation and removal of $CO_2$ or the like. For example, when a concentration of $CO_2$ recovered after desorption is intended to increase, $CO_2$ may be used as a heating gas. When a heating gas and a desorbed gas are intended to be separated, $H_2O$ the saturated vapor pressure of which varies largely by temperature may be used and $H_2O$ may be removed by cooling a recovered gas. When no problem occurs even if a $CO_2$ concentration in a desorbed gas reduces, $N_2$, $O_2$, the atmosphere (air), or the like, those being available at relatively low costs, may be used.

In a configuration of packing a $CO_2$ capturing material and an $H_2O$ capturing material in two or more reaction containers respectively, circulating a heating gas, and desorbing $CO_2$ and $H_2O$, the heating gas may be circulated in the respective reaction containers individually. An advantage on this occasion is that a gas desorbed from a capturing material does not affect another capturing material. Otherwise, a configuration of, in the state of connecting reaction containers, introducing a heating gas from a reaction container, circulating the heating gas to another reaction container, and then discharging the heating gas may also be adopted. On this occasion, a gas used for heating a capturing material can be reused and hence energy consumption can be reduced. Another advantage is that the quantity of a used gas can be reduced. In the configuration, when a capturing material the $CO_2$ capture performance of which deteriorates because $H_2O$ flows in is used for example, it is desirable to control the circulation direction of a heating gas so that desorbed $H_2O$ may not touch the capturing material. For example, when a cerium oxide is used as a $CO_2$ capturing material of the former stage and zeolite is used as a $CO_2$ capturing material of the latter stage, it is desirable to change the gas circulation direction between the time of capture and the time of desorption. A configuration of hardly circulating $H_2O$ at the latter stage by circulating a gas containing $CO_2$ and $H_2O$ in the direction from the former stage to the latter stage is adopted when $CO_2$ and $H_2O$ are captured and a configuration of hardly bringing $H_2O$ desorbed from a cerium oxide of the former stage into contact with zeolite of the latter stage by circulating the heating gas from the latter stage to the former stage is adopted during desorption, and thus the $CO_2$ capture performance of the reaction container of the latter stage comes to be likely to be retained.

An example of a method of depressurizing the atmosphere when a pressure swinging method or a temperature/pressure swinging method is used is a mechanical means of using a pump, a compressor, or the like. An example used when the powdering of a material is influenced by vibration generated by the mechanical means or the like is a method of lowering a saturated vapor pressure by cooling water vapor in the atmosphere of a capturing material, condensing it, and depressurizing the atmosphere, etc. In addition, an example of a method of depressurizing the $CO_2$ partial pressure of the ambient atmosphere of a $CO_2$ capturing material is a method of circulating a gas other than $CO_2$. As a gas used on this occasion, a gas easily separable from $CO_2$ is preferably used. In particular, a method of using water vapor is preferably used from the viewpoint of being easily condensed by cooling.

Examples of a method of pressurizing the ambient atmosphere of a $CO_2$ capturing material include a method of pressurizing mechanically by a pump, a compressor or the like, or a method of introducing a gas having a higher pressure than the ambient atmosphere.

A capturing material may be used in any shape. Examples thereof include a method of forming a capturing material in a powdery shape, a pelletal shape, or a granular shape, and a method of supporting a capturing material by a honeycomb. Those shapes may be decided in view of a required reaction speed, a pressure loss, and a $CO_2$ purity in a desorbed gas. Further, with regard to a void ratio, the void ratio may be lowered when the $CO_2$ purity in a desorbed gas is increased. For example, when a granular shape is formed and a void ratio is small, there is the disadvantage that the pressure loss increases but, since the quantity of a gas other than $CO_2$ remaining in the voids reduces, there is the advantage that the $CO_2$ purity in a recovered gas is improved. Meanwhile, when a capturing material is supported by a honeycomb, a void ratio is high and hence a pressure loss can be reduced, but the quantity of a gas other than $CO_2$ remaining in the voids increases and hence there is the disadvantage that the $CO_2$ purity in a desorbed gas deteriorates.

A reaction container filled with a $CO_2$ capturing material may adopt any configuration and any operating method. An example thereof is a fixed-bed method of filling the interior of a reaction container with a granular or powdery $CO_2$ capturing material and changing a gas introduced into the $CO_2$ capturing material container and the temperature and pressure in the reaction container without moving the $CO_2$ capturing material itself. The configuration has the advantage that performance degradation caused by friction in the capturing material or between the capturing material and the reaction container can be kept low because the movement of the capturing material is low. Further, since a packing density can be increased, it is conceived that a void ratio can be lowered and a removed $CO_2$ quantity per unit capacity can be increased. On the other hand, when a temperature swinging method of heating a capturing material by circulating a heating gas and desorbing $CO_2$ is applied by using the configuration, the switching of a circulating gas is required and hence there is the disadvantage that the configuration of a pipe and a valve becomes complicated.

As a method of moving a $CO_2$ capturing material itself without switching a circulating gas or the like, for example there is a rotor method of disposing a honeycomb rotor by which a $CO_2$ capturing material is supported, a reaction container, and a partition plate for Partitioning gas circulation in the reaction container and separating the interior of the reaction container into a $CO_2$ capturing zone, a $CO_2$ heating and desorbing zone, and a $CO_2$ capturing material cooling zone, and the like in accordance with a gas circulated. By rotating a honeycomb, it is possible to move the $CO_2$ capturing material in the interior to the respective zones and apply the cycle of $CO_2$ capturing, $CO_2$ heating and desorbing, and $CO_2$ capturing material cooling. In the configuration, the $CO_2$ capturing material is supported by the honeycomb and thus the configuration has the advantage that the $CO_2$ capturing material itself wears less and the performance degradation can be suppressed low. Further, since the switching of a circulating gas is not required, the configuration of a pipe and a valve is simplified. Furthermore, it is possible to decide the dimensions of the respective zones by changing the disposition of the partitioning plate and thus the ratios of a $CO_2$ capturing time, a heating and desorbing time, a cooling time, and the like can be decided easily. On the other hand, there are the disadvantages that a void ratio is high, a removed $CO_2$ quantity per unit volume is low, and a $CO_2$ concentration in a $CO_2$ desorbed gas is low. When two or more capturing materials are used in the method, it is possible: to install two or more reaction containers and use honeycomb rotors by which the respective capturing materials are supported in the respective reaction containers; or to divide one honeycomb rotor into the sites for supporting the respective capturing materials and support two or more capturing materials. An example thereof is a method of supporting a $CO_2$ capturing material containing a cerium oxide on the upstream side of the honeycomb rotor and supporting a $CO_2$ capturing material containing zeolite on the downstream side. In the configuration, it is desirable to circulate a gas containing $CO_2$ and $H_2O$ in the direction from the upstream side to the downstream side and a heating gas in the direction from the downstream side to the upstream side, from the viewpoint of inhibiting $H_2O$ from touching zeolite and the $CO_2$ capture performance from degrading.

As another method of moving a $CO_2$ capturing material itself without switching a circulating gas and the like, there is a fluidized bed method of repeating capture and desorption by installing a $CO_2$ capturing reaction container in which a $CO_2$ containing gas circulates and a $CO_2$ capturing material heating container in which a gas for heating a capturing material circulates and moving a granular or powdery capturing material between the containers with the power of a conveyer or a blower. In the configuration, since the switching of a circulating gas is not required, the configuration of a pipe and a valve is simplified. Further, since different void ratios can be set between the time of capture and the time of desorption, for example, it is possible to set a void ratio so as to be low at the time of desorption and increase a $CO_2$ concentration in a $CO_2$ desorbed gas. Meanwhile, since the capturing material itself moves, performance is considered to deteriorate by wear when it is used for a long time. When the gas circulation rate of a boiler exhaust gas or the like is very large, a method of blowing a capturing material upward by a gas in place of a conveyer may be used. On this occasion, a simple configuration can be obtained because the number of mechanical parts reduces in comparison with a conveyer.

Examples according to the present invention are hereunder explained in detail.

Here, with regard to cerium nitrate hexahydrate (Ce$(NO_3)_3 \cdot 6H_2O$) and ammonia water 28% by weight, the materials manufactured by Wako Pure Chemical Industries, Ltd. are used.

Example 1

($CO_2$ Capturing Material Using Cerium Oxide)

Cerium nitrate hexahydrate of 26.05 g is dissolved in purified water of 1,080 g while being stirred intensely at room temperature. pH is set at 9.0 by dropping an ammonia aqueous solution 28% in weight while the aqueous solution is stirred. The aqueous solution is left to stand for one hour after stirred for eight hours and a sediment is accumulated by washing and filtering. Successively, the sediment is dried at 120° C. in a drying furnace and calcined for one hour at 400° C. in an electric furnace under the atmosphere and the obtained cerium oxide is used as a $CO_2$ capturing material.

Example 2

($CO_2$ Capturing Material Using Zirconium Oxide)

Zirconium oxide (RSC-100) manufactured by DAIICHI KIGENSO KAGAKU KOGYO CO., LTD. is used as a $CO_2$ capturing material.

(CO$_2$ Adsorption Test—Absence of H$_2$O Circulation)

The test conditions in the case of adsorbing CO$_2$ without H$_2$O circulation are shown hereunder.

Forming and Disposition

A CO$_2$ capturing material is pelletized at 200 kgf with a press machine by using a die 40 mm in diameter, crushed, and then granulated into grains of 0.5 to 1.0 mm with a sieve. Successively, the CO$_2$ capturing material of 1.0 ml is determined by a measuring cylinder and fixed in a quartz-glass reaction pipe.

Heat Pretreatment:

While He is circulated at a rate of 150 ml/min, the temperature of the CO$_2$ capturing material is raised to 400° C. by an electric furnace and retained for one hour and thus impurities and the gas adsorbed in the capturing material are removed.

Cooling:

After the heat pretreatment, the temperature of the CO$_2$ capturing material is lowered to 50° C. by cooling.

Adsorption:

While the specimen temperature is retained at 50° C. by the electric furnace, the quantity of captured CO$_2$ is measured by CO$_2$ pulse capture test. A mixed gas of 10 ml comprising CO$_2$ of 12% by volume and He of 88% by volume is introduced for two minutes at pulsed intervals of four minutes as a sample gas and the CO$_2$ concentration at the exit of the reaction pipe is measured by gas chromatography. The pulsed introduction is carried out until CO$_2$ measured at the reaction pipe exit is saturated. Further, He is used as the carrier gas.

Heat and Desorption:

The specimen temperature is raised to 400° C. at a rate of 10° C./min in the electric furnace and the quantity of desorbed CO$_2$ is measured.

(CO$_2$ Adsorption Test—Presence of H$_2$O Circulation)

The test conditions in the case of adsorbing CO$_2$ after H$_2$O is circulated are shown. The quantity of the absorbed CO$_2$ is measured by a method similar to the measurement method in the case of "CO$_2$ adsorption test—absence of H$_2$O circulation" except that H$_2$O circulation treatment is applied after cooling and before adsorption in this case.

H$_2$O Circulation Treatment:

In a bubbler container containing water of 25° C., He is circulated at a rate of 150 ml/min for one hour. The temperature of a CO$_2$ capturing material during the treatment is set at 50° C. by the electric furnace.

FIG. 1 is a graph comparing the quantity of captured CO$_2$ between the presence and absence of H$_2$O circulation in a CO$_2$ capturing material according to Example 1. By the H$_2$O circulation, the quantity of captured CO$_2$ reduces by about 10 percent.

Figure 2:
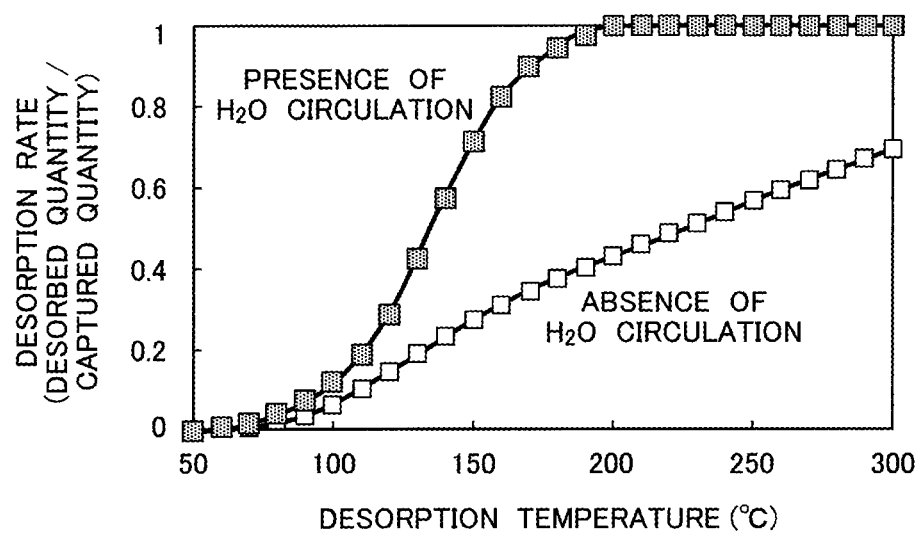
FIG. 2 is a graph comparing the rate of $CO_2$ desorbed during temperature rise between the presence and absence of $H_2O$ circulation in a cerium oxide according to Example 1.

FIG. 2 is a graph comparing the rate of CO$_2$ desorbed during temperature rise between the presence and absence of H$_2$O circulation in the CO$_2$ capturing material according to Example 1. When the H$_2$O circulation is present, the quantity of desorbed CO$_2$ is large at relatively low temperatures of 50° C. to 200° C. and almost the whole CO$_2$ is desorbed before the temperature reaches 200° C. When the H$_2$O circulation is absent in contrast, the CO$_2$ desorption does not complete even when the temperature is raised to 300° C. It has been found from the result that the H$_2$O circulation creates the effect of lowering a CO$_2$ desorption temperature.

Figure 3:
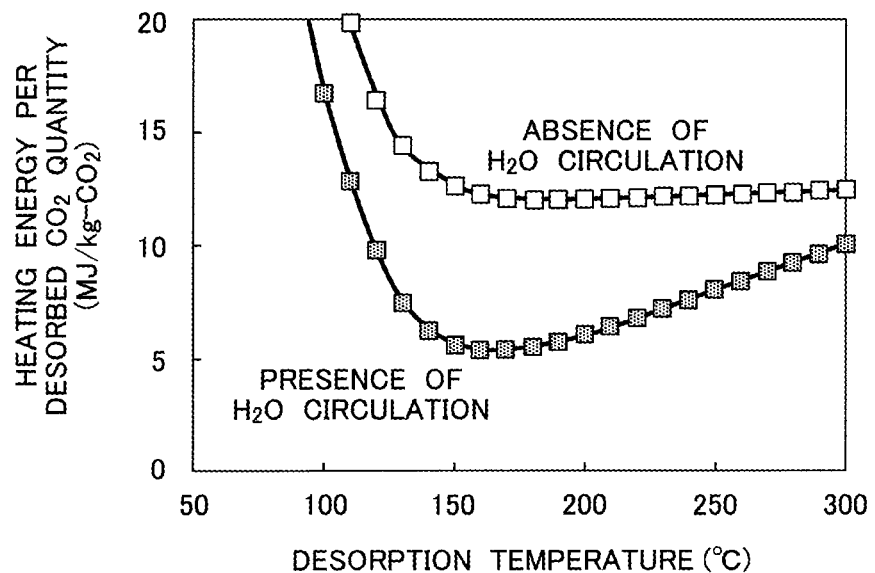
FIG. 3 is a graph comparing the correlation between an energy consumed for heating a capturing material and a temperature when $CO_2$ is desorbed between the presence and absence of $H_2O$ circulation in a cerium oxide according to Example 1.

FIG. 3 shows a heat quantity required for raising the temperature of a cerium oxide and shows the heat quantity per unit desorbed CO$_2$ quantity. The specific heat of the cerium oxide is set at 382 J/K·kg and a heat quantity H required for raising temperature is calculated by the following expression. Here, in the present test, the bulk density of the cerium oxide is set at 1.41 (kg/L), a quantity of desorbed CO$_2$ is represented by $Q_d$, and a desorption temperature is represented by $T_d$, and a heat quantity H is calculated by the following expression (2).

$$H=1{,}000\ (g)/44\ (g/mol) \times 1{,}000/Q_d\ (mmol/L) \times 1.41\ (kg/L) \times (T_d-50)(K) \times 382\ (J/K \cdot kg) \quad (2)$$

It has been found from the result that the energy required for heating can be reduced more in the case of the presence of the H$_2$O circulation.

Figure 4:
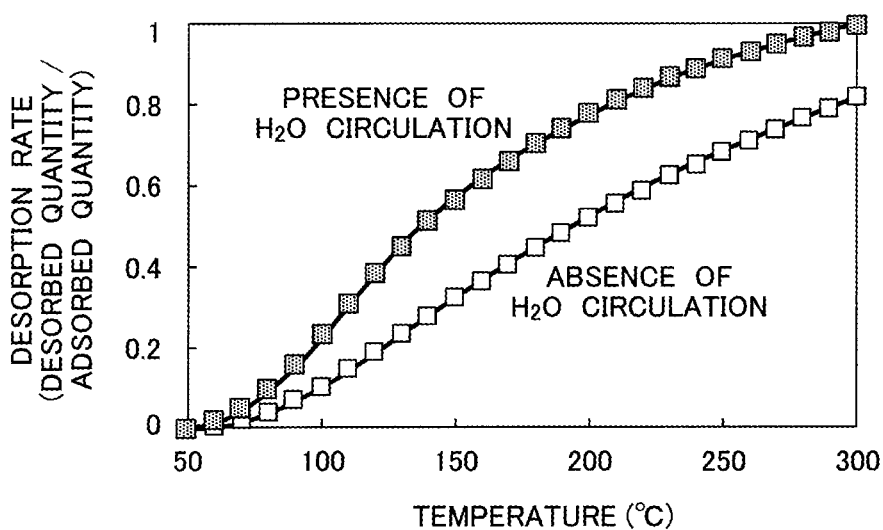
FIG. 4 is a graph comparing the rate of $CO_2$ desorbed during temperature rise between the presence and absence of $H_2O$ circulation in a zirconium oxide according to Example 2.

FIG. 4 is a graph comparing the rate of CO$_2$ desorbed during temperature rise between the presence and absence of H$_2$O circulation in a CO$_2$ capturing material according to Example 2. When the H$_2$O circulation is present, the quantity of desorbed CO$_2$ is large at 50° C. to 200° C. and it has been found from the result that the H$_2$O circulation creates the effect of lowering a CO$_2$ desorption temperature.

(Evaluation Method of Specific Surface Area)

With regard to a cerium oxide according to Example 1, the adsorption isothermal line of nitrogen is measured at $-196$° C. by a BET (Brunauer-Emmett-Teller) method and a specific surface area is measured. As pretreatment, heating is applied at 200° C. while vacuuming is applied. The specific surface area of Example 1 is 130 m$^2$/g.

(Measurement of H$_2$O Adsorption Isothermal Line)

The H$_2$O adsorption isothermal line of a cerium oxide according to Example 1 is measured. As pretreatment, heating is applied at 200° C. while vacuuming is applied. Successively, cooling is applied while vacuuming is applied and H$_2$O is adsorbed while the temperature of the specimen is retained at 25° C.

(Calculation of H$_2$O Monomolecular Layer Adsorption Quantity)

An adsorption quantity $Q_{m1}$ for forming an H$_2$O monomolecular layer on the surface of a cerium oxide according to Example 1 is calculated. A specific surface area obtained by the BET method is represented by $S_A$, the Avogadro's number $N_A$ is set at $6.02 \times 10^{23}$, and an adsorption sectional area of H$_2$O is set at $1.25 \times 10^{-19}$ m$^2$, and an adsorption quantity $Q_{m1}$ is calculated by the following expression (3).

$$Q_{m1}=S_A \div 1.25 \times 10^{-19} \div 6.02 \times 10^{23} \times 1{,}000 \quad (3)$$

As a result of the calculation, the calculated H$_2$O monomolecular layer adsorption quantity $Q_{m1}$ is 1.8 mol/kg.

Figure 5:
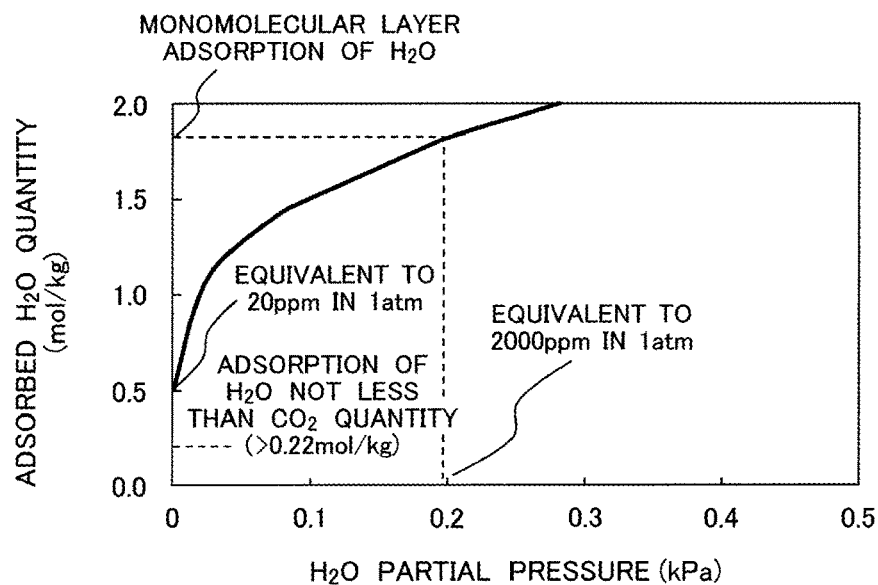
FIG. 5 is a graph showing the correlation between the quantity of an absorbed $H_2O$ and a partial pressure of $H_2O$ in a cerium oxide according to Example 1.

FIG. 5 is a graph showing the H$_2$O adsorption isothermal line of a cerium oxide according to Example 1. From the result, the H$_2$O partial pressure that allows the quantity of H$_2$O adsorbed in the cerium oxide according to Example 1 to be not less than an adsorbed CO$_2$ quantity (300 mol/L÷1.41 kg/L=0.22 mol/kg) is not more than 0.002 kPa. An H$_2$O concentration may be about 20 ppm in order to secure the H$_2$O partial pressure in the atmospheric pressure. That is, to introduce a gas of the H$_2$O concentration is thought to be the condition for securing reaction when H$_2$O/CO$_2$ is not less than 1 in terms of mole ratio. A hydroxyl group (—OH) of 1 mole is thought to be necessary on a surface in order to form a hydrogen carbonate of 1 mole. Assuming that surface oxygen (O) of 1 mole reacts with H$_2$O of 1 mole and a hydroxyl group of 2 moles is generated as a mechanism of forming a hydroxyl group, H$_2$O/CO$_2$ only have to be not less than 0.5 in terms of mole ratio and it is estimated that the reaction advances sufficiently as long as H$_2$O/CO$_2$ is not less than 1.0 in terms of mole ratio. As long as the H$_2$O concentration is 20 ppm as stated above, H$_2$O/CO$_2$ can exceed 1.0 in terms of mole ratio. Further, the formation of a hydroxyl group is thought to be further promoted if the surface of a cerium oxide is covered with an $H_2O$ monomolecular layer. An $H_2O$ partial pressure necessary for an adsorbed $H_2O$ quantity to be equivalent to an $H_2O$ monomolecule adsorption quantity is 0.2 kPa. An $H_2O$ concentration may be about 2,000 ppm in order to secure the $H_2O$ partial pressure in the atmosphere.

In the above calculation, an adsorbed $CO_2$ quantity increases if the specific surface area of a ceriumoxide increases, but an adsorbed $H_2O$ quantity is thought to increase also in proportion to the specific surface area, and hence the correlation of the $H_2O$ concentration obtained on the basis of Example 1 is thought to be able to be used also for another material.

The correlation between an $H_2O$ concentration and an adsorbed $H_2O$ quantity varies in accordance with the temperature of a capturing material but $H_2O$ has the nature of showing nearly an equivalent adsorbed $H_2O$ quantity if a saturated vapor pressure and a relative pressure P/P0 are equivalent at the temperature. When the temperature of a capturing material varies therefore, an $H_2O$ concentration may be decided on the basis of a saturated vapor pressure at the temperature.

Example 3

Figure 6:
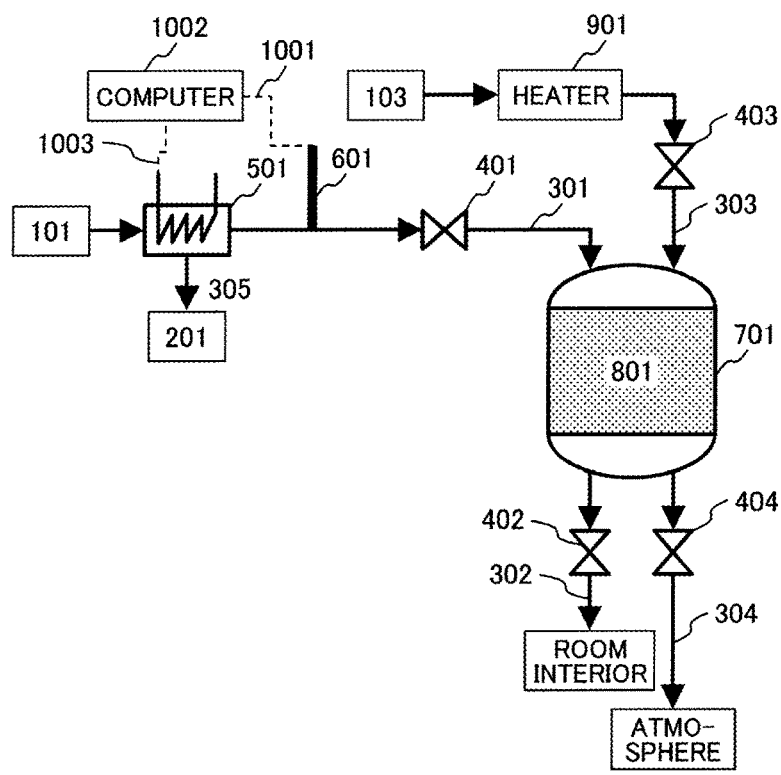
FIG. 6 is a schematic configuration diagram showing a $CO_2$ removal device (a fixed bed type) according to Example 3.

FIG. 6 shows an example of applying a $CO_2$ capturing material according to Example 1 to a fixed bed type $CO_2$ removal device and introducing a $CO_2$ removed gas into a room interior.

The $CO_2$ removal device shown in FIG. 6 includes a pipe 301 for circulating a gas 101 containing $H_2O$ and $CO_2$, a condenser 501, a pipe 305 for discharging water 201 condensed at the condenser 501, an $H_2O$ densitometer 601, a means 1001 for imputing a signal from the $H_2O$ densitometer 601 to a computer 1002, a means 1003 for outputting a signal for controlling the condenser 501 from the computer 1002, a valve 401 for controlling the circulation of the gas 101, a reaction container 701, a $CO_2$ capturing material 801 containing a cerium oxide according to Example 1 and being packed granularly in the reaction container 701, a pipe 302 for circulating the gas in the reaction container to a room interior, a valve 402 for controlling the gas circulation in the pipe 302, a heater 901, a pipe 303 for circulating a heating gas 103 taken in from the atmosphere to the reaction container 701, a valve 403 for controlling the gas circulation in the pipe 303, a pipe 304 for discharging the gas in the reaction container to the atmosphere, and a valve 404 for controlling the gas circulation in the pipe 304.

When $CO_2$ is captured, by opening the valves 401 and 402 and closing the valves 403 and 404, $CO_2$ and $H_2O$ in the gas 101 containing $H_2O$ and $CO_2$ are captured in the $CO_2$ capturing material 801 and the gas from which $H_2O$ and $CO_2$ have been removed circulates to the room interior.

When $CO_2$ captured in the $CO_2$ capturing material is desorbed, by opening the valves 403 and 404 and closing the valves 401 and 402, the gas 103 taken in from the atmosphere is heated by the heater 901 and circulates in the reaction container 701, the $CO_2$ capturing material 801 is heated, and the captured $CO_2$ desorbs. The desorbed gas circulates in the pipe 304 and is discharged to the atmosphere.

Example 4

Figure 7:
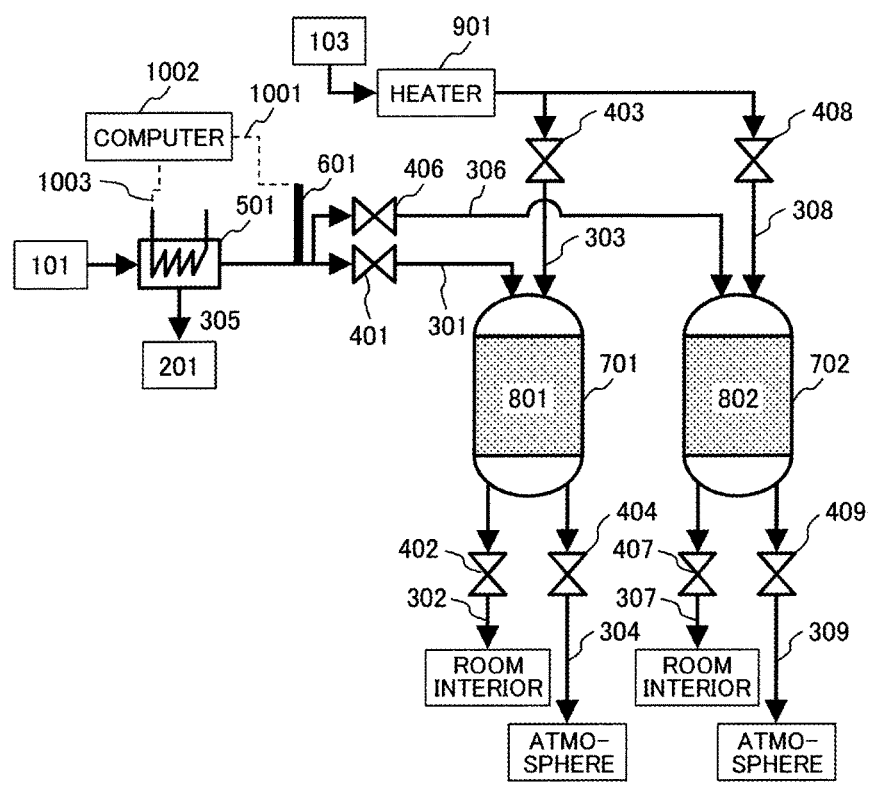
FIG. 7 is a schematic configuration diagram showing a $CO_2$ removal device (a fixed bed type) according to Example 4, which enables $CO_2$ to be continuously removed.

FIG. 7 shows an example of applying a $CO_2$ capturing material according to Example 1 to a fixed bed type $CO_2$ removal device and continuously circulating a $CO_2$ removed gas to a room interior with two reaction containers.

FIG. 7 shows a configuration formed by adding a reaction container 702, a $CO_2$ capturing material 802 containing a cerium oxide and being packed granularly in the reaction container 702, a pipe 306 for circulating a gas 101 containing $H_2O$ and $CO_2$ to the reaction container 702, a valve 406 for controlling the gas circulation in the pipe 306, a pipe 307 for circulating the gas in the reaction container to a room interior, a valve 407 for controlling the gas circulation in the pipe 307, a pipe 308 for circulating a heating gas 103 taken in from the atmosphere to the reaction container 702, a valve 408 for controlling the gas circulation in the pipe 308, a pipe 309 for discharging the gas in the reaction container to the atmosphere, and a valve 409 for controlling the gas circulation in the pipe 309 to the configuration according to Example 3.

When $CO_2$ is captured in the reaction container 701 and desorbed in the reaction container 702, the valves 401, 402, 408, and 409 should be opened and the valves 403, 404, 406, and 407 should be closed. When CO2 is desorbed in the reaction container 701 and captured in the reaction container 702, the valves 403, 404, 406, and 407 should be opened and the valves 401, 402, 408, and 409 should be closed. By the configuration and the operation method, the gas from which $CO_2$ has been removed can be circulated to the room interior continuously.

Example 5

Figure 8:
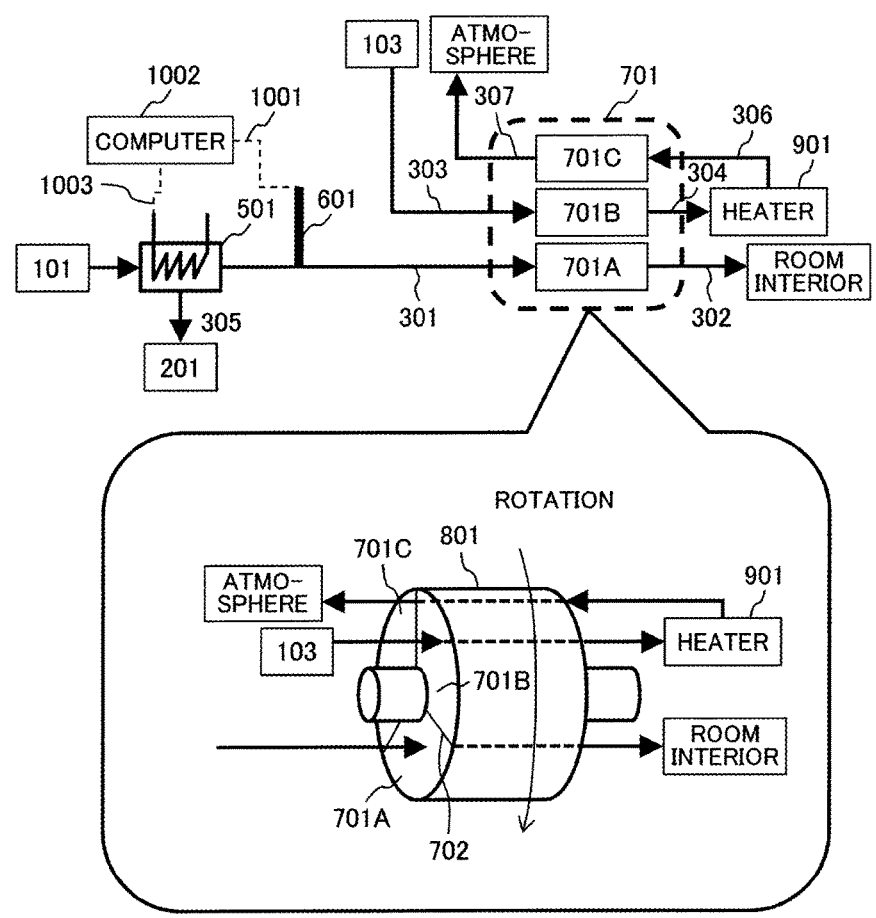
FIG. 8 is a schematic configuration diagram showing a $CO_2$ removal device (a rotor type) according to Example 5.

FIG. 8 shows an example of using a rotor type $CO_2$ removal device and introducing a $CO_2$ removed gas into a room interior.

In the $CO_2$ removal device shown in FIG. 8, a honeycomb rotor 801 supporting a $CO_2$ capturing material containing a cerium oxide according to Example 1 is disposed in the interior of a reaction container 701 and the route of gas circulation is restricted by a partition plate 702 in the reaction container. The zones 701A, 701B, and 701C in the reaction container 701 are gas circulation ranges determined by the partition plate 702. The position of the partition plate 702 does not vary even when the honeycomb rotor 801 rotates but the site of the honeycomb rotor touching a gas varies by the rotation of the honeycomb rotor 801. In the configuration, $CO_2$ is captured by circulating a gas containing $H_2O$ and $CO_2$ in the zone 701A (capturing zone), $CO_2$ is desorbed by circulating a gas heated at a heater 901 in the zone 701C (desorbing zone), and the $CO_2$ capturing material is cooled by circulating a gas 103 taken in from the atmosphere in the zone 701B (cooling zone).

The $CO_2$ removal device includes a pipe 301 for circulating a gas 101 containing $H_2O$ and $CO_2$ to a zone 701A in a reaction container 701, a condenser 501, a pipe 305 for discharging condensed water 201 from the condenser, an $H_2O$ densitometer 601, a means 1001 for inputting a signal from the $H_2O$ densitometer to a computer 1002, a means 1003 for outputting a signal from the computer 1002 in order to control the condenser 501, the reaction container 701, a rotatable honeycomb rotor 801 being installed in the reaction container 701 and supporting a $CO_2$ capturing material, a partition plate 702 installed in the reaction container for partitioning gas circulation, a pipe 302 for circulating a gas discharged from the zone 701A to a room interior, a pipe 303 for circulating a gas 103 taken in from the atmosphere to a zone 702B, a heater 901, a pipe 304 for circulating a gas discharged from the zone 701B to the heater 901, a pipe 306 for circulating a gas discharged from the heater 901 to a zone 701C, and a pipe 307 for emitting a gas discharged from the zone 701C to the atmosphere.

In the device, by circulating a gas containing $H_2O$ and $CO_2$ to the zone 701A, $H_2O$ and $CO_2$ are captured by the $CO_2$ capturing material in the honeycomb rotor and the gas from which $H_2O$ and $CO_2$ are removed circulates to the room interior. By the rotation of the honeycomb rotor, a part that has captured $CO_2$ moves to the zone 701O, the heated gas circulates, and thus $CO_2$ is desorbed. A heated part from which $CO_2$ is desorbed moves to the zone 701B and is cooled by a gas taken in from the atmosphere. The cooled part moves to the zone 701A and captures $CO_2$ again.

In the configuration, since the gas 103 taken in from the atmosphere is used for cooling the honeycomb rotor, the gas is heated. Since the gas is further heated by the heater 901 and used, the load of the heater 901 can be reduced.

Example 6

Figure 9:
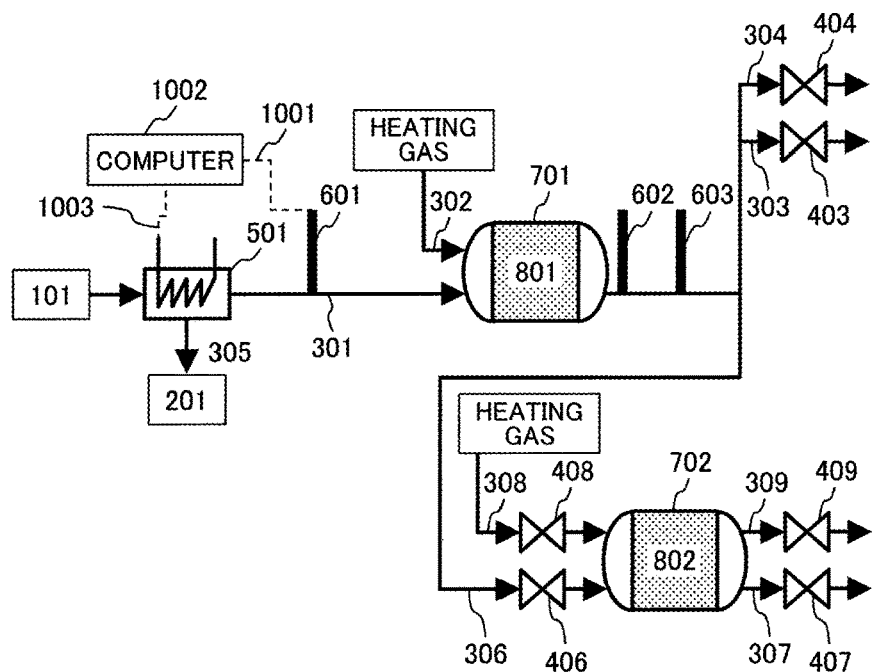
FIG. 9 is a schematic configuration diagram showing a $CO_2$ removal device according to Example 6, which uses two reaction containers and removes $H_2O$, $CO_2$, or both of them in a reaction container by switching a valve when capture saturation occurs in the other reaction container.

FIG. 9 shows an example of removing $H_2O$ and $CO_2$ with two or more $CO_2$ capturing materials and two or more reaction containers.

In a $CO_2$ removal device shown in FIG. 9, a cerium oxide and zeolite are used as the $CO_2$ capturing materials.

The device includes a pipe 301 for circulating a gas 101 containing $H_2O$ and $CO_2$ to a reaction container 701, a $CO_2$ capturing material 801 containing a cerium oxide according to Example 1 and being packed in the reaction container 701, a condenser 501, a pipe 305 for discharging condensed water from the condenser, an $H_2O$ densitometer 601, a means 1001 for inputting a signal from the $H_2O$ densitometer 601 to a computer 1002, a means 1003 for outputting a signal from the computer 1002 in order to control the condenser 501, a pipe 302 for circulating a heating gas, a pipe 303 for circulating a gas discharged from the reaction container 701 to a room interior, a valve 403 for controlling the gas circulation in the pipe 303, a pipe 304 for emitting a gas from the reaction container 701 to the atmosphere, a valve 404 for controlling the gas circulation in the pipe 304, an $H_2O$ densitometer 602 for further measuring the $H_2O$ concentration in the gas discharged from the reaction container 701, a $CO_2$ densitometer 603, a reaction container 702, a capturing material 802 containing zeolite and being packed in the reaction container, a pipe 306 for circulating a gas from the reaction container 701 to the reaction container 702, a valve 406 for controlling the gas circulation in the pipe 306, a pipe 307 for circulating a gas discharged from the reaction container 702 to the room interior, a valve 407 for controlling the gas circulation in the pipe 307, a pipe 309 for emitting a gas from the reaction container 702 to the atmosphere, a valve 409 for controlling the gas circulation in the pipe 309, a pipe 308 for circulating a heating gas to the reaction container 701, and a valve 408 for controlling the gas circulation in the pipe 308.

For example, when the capture of only $H_2O$ is likely to be saturated in the $CO_2$ capturing material 801, a capturing material selectively capturing $H_2O$ should be packed as the capturing material 802 in the reaction container 702 of the latter stage. Inversely, when the capture of only $CO_2$ is likely to be saturated in the $CO_2$ capturing material 801, by packing a capturing material selectively capturing $CO_2$ as the capturing material 802 in the reaction container 702 of the latter stage, a gas from which $H_2O$ and $CO_2$ have been removed can be circulated stably to the room interior.

Example 7

Figure 10:
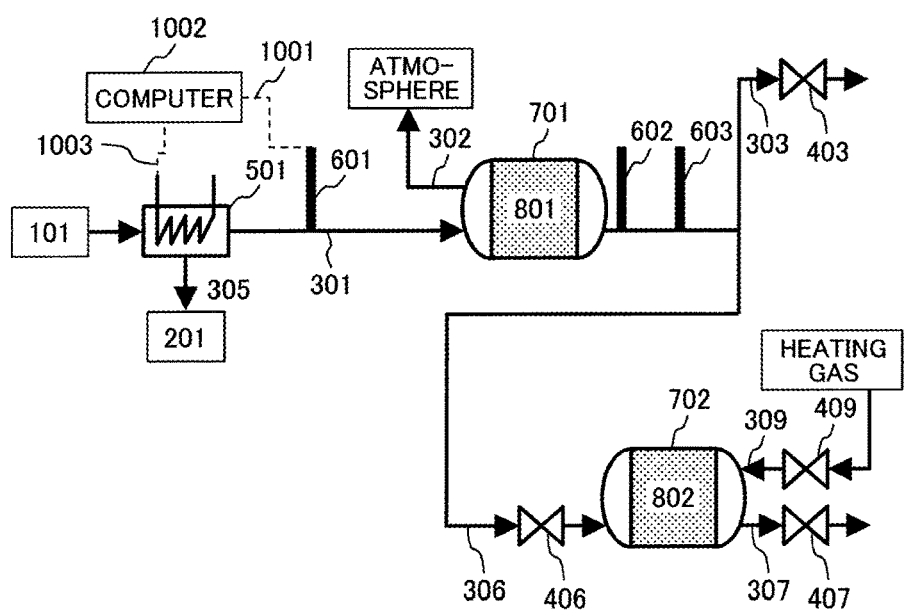
FIG. 10 is a schematic configuration diagram showing a $CO_2$ removal device according to Example 7, which uses two reaction containers and reverses the direction of the circulation of a gas containing $CO_2$ and $H_2O$ and the direction of the circulation of a heating gas.

FIG. 10 shows an example of removing $H_2O$ and $CO_2$ with two or more $CO_2$ capturing materials and two or more reaction containers.

In the example, a cerium oxide and zeolite are used as the $CO_2$ capturing materials.

In FIG. 10, a $CO_2$ capturing material 801 containing a cerium oxide is used in a reaction container 701 and a $CO_2$ capturing material containing zeolite is used in a reaction container 702. Whereas the flow of gas circulation is directed from the reaction container 701 to the reaction container 702 when $H_2O$ and $CO_2$ are removed from a gas containing $H_2O$ and $CO_2$, the opening and closing of valves are adjusted so that the flow of heating gas circulation may be directed from the reaction container 702 to the reaction container 701 when $H_2O$ and $CO_2$ are removed by the circulation of a heating gas. The purpose is to prevent $H_2O$ from being captured intensively in zeolite by bringing $H_2O$ desorbed from the $CO_2$ capturing material 801 containing a cerium oxide into contact with zeolite in the reaction container 702.

REFERENCE SINGS LIST

101: Gas containing $H_2O$ and $CO_2$,
103: Heating gas,
301, 302, 303, 304: Pipe,
401, 402, 403, 404: Valve,
501: Condenser,
601: $H_2O$ densitometer,
701: Reaction container,
801, 802: $CO_2$ capturing material,
901: Heater.

The invention claimed is:

1. A $CO_2$ removal device comprising:
a $CO_2$ capturing material which captures $H_2O$ and $CO_2$ in a gas;
a reaction container which contains the $CO_2$ capturing material;
an $H_2O$ measuring unit for measuring the concentration of $H_2O$ in the gas;
an $H_2O$ concentration adjustment device which adjusts the concentration of $H_2O$ on the basis of information obtained by the $H_2O$ measuring unit;
a gas introduction path for introducing the gas into the reaction container from the $H_2O$ concentration adjustment device and bringing the gas into contact with the $CO_2$ capturing material;
a first gas discharge path for discharging the gas from the reaction container after the gas has been brought into contact with the $CO_2$ capturing material; and
a second gas discharge path for discharging the gas that has been desorbed from the $CO_2$ capturing material from the reaction container.

2. The $CO_2$ removal device according to claim 1, wherein the $CO_2$ capturing material contains at least one kind selected from the group consisting of a metal oxide, an activated carbon, a carbonate of alkali metal, a hydroxide of alkali metal, a layered double hydroxide, and a solid organic compound.

3. The $CO_2$ removal device according to claim 2, wherein the $CO_2$ capturing material contains an oxide or a complex oxide containing at least one metal element selected from the group consisting of cerium, a rare-earth metal other than cerium, and zirconium.

4. The $CO_2$ removal device according to claim 1, comprising two or more the reaction containers.

5. The $CO_2$ removal device according to claim 4, wherein:
at least one of the reaction containers has a capturing material containing an oxide or a complex oxide containing at least one metal element selected from the group consisting of cerium, a rare-earth metal other than cerium, and zirconium; and the other reaction container of the reaction containers has a capturing material containing at least one metal oxide selected from the group consisting of silica, alumina, and zeolite.

6. The $CO_2$ removal device according to claim 5, wherein, when a capturing material containing an oxide or a complex oxide containing at least one metal element selected from the group consisting of cerium, a rare-earth metal other than cerium, and zirconium is defined as a capturing material A, a capturing material containing at least one metal oxide selected from the group consisting of silica, alumina, and zeolite is defined as a capturing material B, and $CO_2$, $H_2O$, or both of them is/are removed from the gas, a circulation of the gas is directed from the capturing material A to the capturing material B.

7. The $CO_2$ removal device according to claim 1, further comprising a heating means to heat the $CO_2$ capturing material.

8. The $CO_2$ removal device according to claim 1, wherein:
a heating fluid is configured so as to touch the $CO_2$ capturing material; and
the heating fluid is a fluid containing at least one gas selected from the group consisting of $CO_2$, water vapor, $N_2$, a combustion exhaust gas, and a gas obtained by being heated after taken in from the atmosphere.

9. The $CO_2$ removal device according to claim 8, wherein a direction of a circulation of the gas is identical to a direction of a circulation of the heating fluid.

10. The $CO_2$ removal device according to claim 8, wherein a direction of a circulation of the gas is opposite to a direction of a circulation of the heating fluid.

11. The $CO_2$ removal device according to claim 7, comprising a device for circulating a heating medium of a temperature higher than the $CO_2$ capturing material in a heat transfer device and heating the $CO_2$ capturing material by the heat transferred from the heat transfer device.

12. The $CO_2$ removal device according to claim 11, wherein the high temperature heating medium is a gas containing water vapor.

13. The $CO_2$ removal device according to claim 7, wherein the heating means is a device to heat by electric power.

14. The $CO_2$ removal device according to claim 1, further comprising a depressurizing device for depressurizing the reaction container.

15. The $CO_2$ removal device according to claim 1, further comprising a pressurizing device for pressurizing the reaction container.

16. The $CO_2$ removal device according to claim 1, wherein the gas has a pressure higher than the atmospheric pressure.

* * * * *